Aug. 21, 1928.
C. GOTTWALD
1,681,731
CONDUIT CONSTRUCTION FOR UNDERGROUND PIPES
Filed April 3, 1922
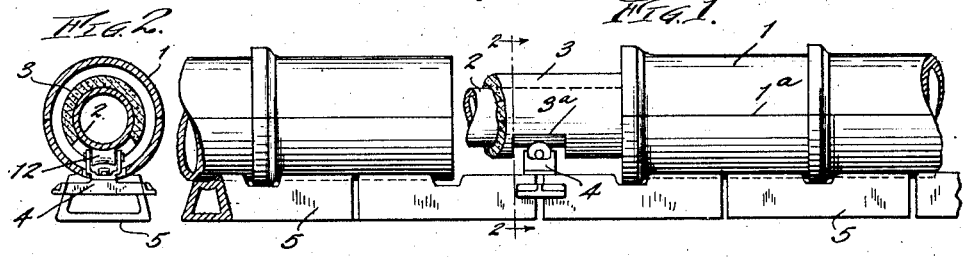
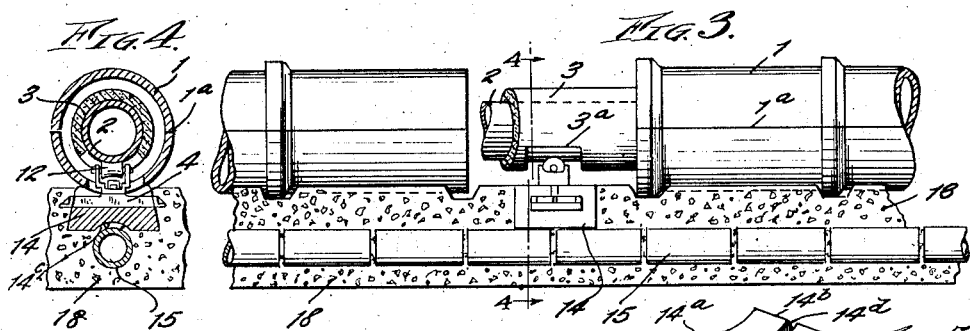
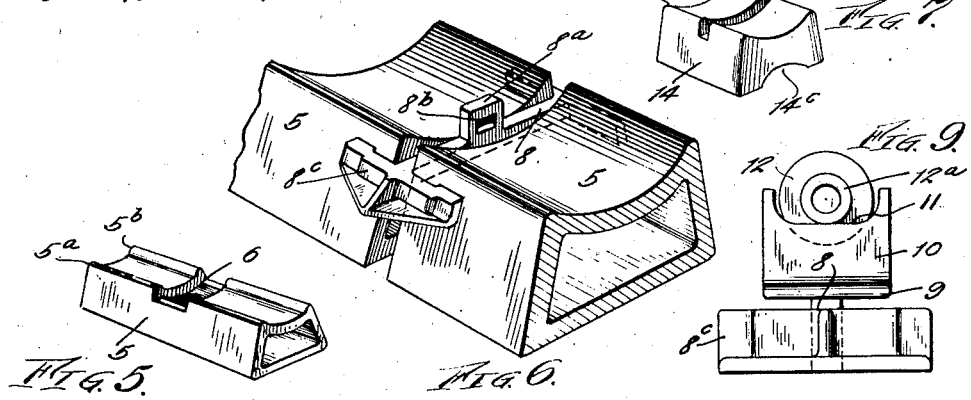
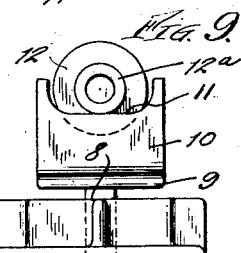
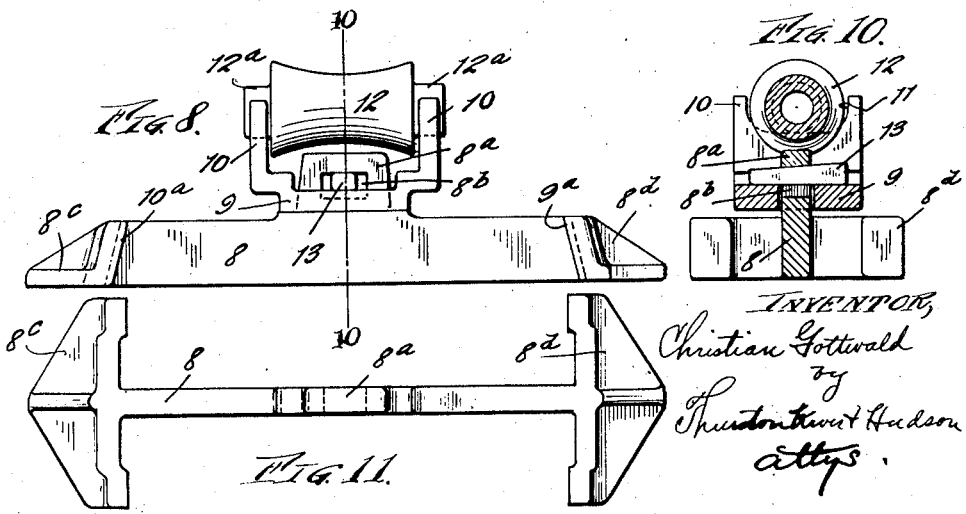
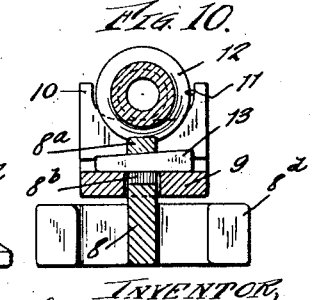
INVENTOR
Christian Gottwald
by
Thurston Kwis & Hudson
attys.

Patented Aug. 21, 1928.

1,681,731

UNITED STATES PATENT OFFICE.

CHRISTIAN GOTTWALD, OF CLEVELAND, OHIO, ASSIGNOR TO THE RIC-WIL COMPANY, OF CLEVELAND, OHIO, A CORPORATION OF OHIO.

CONDUIT CONSTRUCTION FOR UNDERGROUND PIPES.

Application filed April 3, 1922. Serial No. 549,236.

The herein described and claimed invention relates to a construction for insulating and protecting under ground pipes used in the transmission of steam, hot water or other liquid or gaseous materials.

The object of the invention is to provide a construction in which vitreous pipe sections, which may be of the usual bell and spigot form, may be used to house a pipe line suitably protected by the use of heat insulating material, and to provide a suitable base support for the pipe sections which will take care of the drainage, and also will provide suitable foundation to support roller devices upon which the inside gas or fluid conducting pipe is supported and maintained.

Reference should be had to the accompanying drawings forming a part of this specification, in which Fig. 1 is a side elevation showing one form of the invention; Fig. 2 is a section on the line 2—2 of Fig. 1; Fig. 3 is an elevation of a modified form of construction; Fig. 4 is a section upon the line 4—4 of Fig. 3; Fig. 5 is a base member such as shown in Fig. 1; Fig. 6 is a perspective view showing the assemblage of two base members such as shown in Fig. 2 with the saddle portion of a pipe support associated therewith; Fig. 7 is a perspective view of a pipe supporting base block such as shown in the construction of Fig. 3; Fig. 8 is a front elevation of a pipe support; Fig. 9 is an end elevation of the pipe support; Fig. 10 is a transverse section on the line 10—10 of Fig. 8, and Fig. 11 is a top plan view of the saddle of the pipe support.

Referring to Fig. 1 of the drawing, the pipe sections which are indicated at 1 may conveniently be formed of vitrified glazed tile, and for convenience may be split horizontally along the line 1$^a$, so that it may conveniently be removed from the lower section when it is necessary to gain access to the inside of the pipe for repair purposes or any other purpose.

Extending through the assembled pipe sections 1 is a conduit or pipe 2 which is adapted to conduct a gaseous or liquid material either in hot or cold state. For the purpose of heat insulating this pipe 2 there is a cover 3 which may be of any usual or desired form or composition. The pipe 2 is supported within the aligned pipe section 1 by means of pipe supports, one of which is shown at Fig. 1 and indicated at 4.

It will be understood that these pipe sections are located at convenient intervals throughout the length of the assembled pipe members 1, the frequency of their occurrence being chosen in accordance with the number of points at which the pipe 2 must be supported. At the place where the pipe 2 cooperates with one of these pipe supports the heat insulating material covering is cut away as indicated at 3$^a$.

Attention should be called to the fact that in Fig. 1 where the pipe 2 and its covering are exposed, it is usually covered by means of a pipe section similar to the section 1, it being omitted in the drawing for purposes of clearer illustration. This tile section which has been omitted from Fig. 1 is provided with a suitable opening in the lower part thereof through which the pipe member 4 extends.

The assembled pipe sections or conduit sections 1 are mounted upon a series of base members which are indicated at 5 and are more clearly shown in Fig. 5. Each of these base members is hollow, as clearly indicated. Between its end is a slot 6 which is adapted to receive the bell end of each of the pipe or conduit sections 1.

The top surface of the base member 5 is provided adjacent the edge with upstanding ribs 5$^a$ and 5$^b$, and the intermediate surface between the ribs is depressed and may be slightly rounded, but the construction is such that when a pipe or conduit section is assembled with respect to the base member 5, the ribs 5$^a$ and 5$^b$ will receive the outer surface of the conduit or pipe section 1 so that it will be supported at the two points only, thus providing two certain points of support, by which the weight is transmitted to the ground because the base members 5 are supported on the ground or any suitable foundation.

The base members 5 are normally placed end to end but not in contact, sufficient space being left to permit the entrance of drainage water which may flow through the hollow base members 5 and be conducted to any suitable point. Each pipe supporting member comprises a saddle portion which consists of a web member 8 which has end members 8ᶜ and 8ᵈ, the inner surfaces of which members are slanting, as indicated at 10ᵃ and 9ᵃ. At the central portion of the web member there is an upstanding loop 8ᵃ which has an eye 8ᵇ. The central member 9 has end portions 10 which are formed with elongated reentrant recesses 11, and these recesses form supports for the trunnions 12ᵃ of a roller 12. The roller has a concave outer surface, being fashioned to accommodate the cylindrical surface of a pipe, such as the pipe 2 which the roller 12 supports when the same is in use.

For the purpose of holding the member 9 onto the saddle member a wedge 13 may be passed through the eye 8ᵇ of the loop 8ᵃ, and above the lower portion of the member 9 thus holding these together.

In Fig. 6 two adjacent base members 5 are shown and the manner in which the saddle is supported with respect to them.

As before stated, the adjacent ends of the base members are not placed in contact because it is desired to allow space for assemblage of drain water so that it may enter into the inside of the base member 5 and flow through these members as a channel.

Taking advantage of this fact, the web 8 of the saddle slips between the adjacent ends of the base members and the heads 8ᶜ and 8ᵈ will engage with the opposite side walls of the base members 5, and for this purpose the inner walls 9ᵃ and 10ᵃ of the end members of the saddle are slanted so as to have approximately the same degree of slant as the side walls of the base members 5.

This provides a very efficient and strong support for the saddle of the pipe supporting member because the weight of the pipe on the pipe supporting member wedges the saddle into closer engagement with the base members, and furthermore the heads on the saddle tend to keep these base members with which the saddle is associated in alignment and retain them against movement.

Where it is desired to directly support the pipe or conduit sections 1 upon a crushed rock or coarse gravel foundation instead of using the base blocks or base supporting members 5, the construction assumes a form which is shown in Fig. 3, in which the conduit sections 1 and the pipes and covering mounted therein are the same as previously shown. In this figure the base is indicated at 18. In order to support the pipe supporting members 4, a base block is provided which is indicated at 14. This base block has on its upper surface ribs 14ᵃ and 14ᵇ which are adjacent the edges thereof, and which are adapted to cooperate with the cylindrical surface of the conduit section 1 which may be above it.

At the central portion and extending transversely there is a slot or groove 14ᵈ, and this groove is adapted to receive the web 8 of the saddle of the pipe supporting device, and the heads 8ᶜ and 8ᵈ will co-operate with the slanting side walls of the block 14, as will be readily understood.

The under surface of the block 14 is provided with a semi-cylindrical groove 14ᶜ, and is adapted to span the cylindrical tile members such as indicated at 15, these tile members being of any desired composition, such for instance, as vitrified glazed pipe or the ordinary red farm drain tile.

The block 14 is positioned right in the base 13. These blocks 14 are placed at desired points throughout the length of the base 13, the spacing between these blocks 14 being that which is desired or necessary to provide the proper support for the inside pipe 12.

It will be understood that in Fig. 3 the central pipe or conduit section is omitted for the purpose of showing the construction, but that the portions which are shown at the central part of Fig. 3 are developed in a tile pipe or concrete, and for the purpose of permitting the pipe supporting device 4 to extend through such a tile will be provided with an opening in the lower part thereof.

Having described my invention, I claim:—

1. In combination an underground conduit for pipes comprising a conduit composed of abutting sections and having openings in the bottom thereof, conduit supporting members upon which sections of the conduit rest, and means for supporting a pipe within the conduit comprising a plurality of supporting structures each having a saddle portion extending transversely beneath the conduit and having end portions engaging opposite side faces of the conduit supporting members and pipe supporting portions extending upwardly through said openings.

2. An underground conduit construction for pipes comprising a conduit composed of a plurality of abutting sections, a pipe extending through said sections and housed thereby, means forming a base by which said conduit sections are supported, said means including blocks which are spaced apart throughout the length of the base and have spaced longitudinally extending conduit supporting ribs, a plurality of pipe supporting structures each of which is associated with a block before mentioned, there being an opening in the underside of the conduit for each of the pipe supporting structures through which said pipe supporting structures may be passed and each of said pipe supporting structures extending through one of said openings in the lower portion of the conduit adjacent to which it is placed, the said supporting device serving to support the pipe within the conduit.

3. An underground conduit construction for pipes comprising a conduit composed of a plurality of abutting pipe sections certain of said sections being provided with an opening in the lower portion thereof, a pipe extending through said sections and housed thereby, a plurality of base members arranged beneath the said conduit sections for supporting the same, each of said base members having drainage provisions, a plurality of pipe supporting structures carried by said base members and spaced at intervals throughout the length of the base, each of said pipe supporting structures extending through a suitable opening formed in the lower portion of the conduit adjacent to which it is placed, the said supporting devices serving to support the pipe within the conduit.

4. An underground conduit construction for pipes comprising a conduit composed of a plurality of abutting sections, a pipe extending through said sections and housed thereby, a plurality of base members arranged end to end and having drainage provisions, a plurality of pipe supporting structures carried by the said base and spaced at intervals throughout the length of the base, each of said pipe supporting structures comprising a saddle having a web and end head members, the web being adapted to occupy a position between two adjacent members with the heads engaging with the opposite side surfaces of the adjacent members, an intermediate member carried by the saddle member and extending through a suitable opening formed in the conduit adjacent to which it is placed, a movable member carried by the intermediate member and adapted to support the pipe within the conduit.

5. An underground conduit construction for pipes comprising a conduit composed of a plurality of abutting sections, a pipe extending through said sections and housed thereby, a plurality of hollow base members each of said base members having on its upper surfaces parallel ribs which ribs engage and support the said conduit sections, a plurality of pipe supporting structures carried by the said base and spaced at intervals throughout the length of said base, each of said pipe supporting structures extending through a suitable opening formed in the conduit adjacent to which it is placed, the said supporting devices serving to support the pipe within the conduit.

6. An underground conduit construction for pipes comprising a conduit composed of a plurality of abutting pipe sections, a pipe extending through said sections and housed thereby, a substantially continuous base member located beneath the conduit, each of the said base members being provided with longitudinally extending ribs forming a two-line supporting contact with the adjacent conduit section, a plurality of supporting structures carried by said base and spaced at intervals throughout the length of the base, each of said pipe supporting structures extending through a suitable opening formed in the conduit section adjacent to which it is placed through which the pipe supporting structure may be passed, the said supporting devices serving to support the pipe within the conduit.

7. An underground conduit construction for pipes comprising a conduit composed of a plurality of abutting sections, a pipe extending through said sections and housed thereby, a plurality of base members each of said base members being hollow and provided with slanting sides, the said base member serving to support the conduit sections, a plurality of pipe supporting structures carried by the said base and spaced at intervals throughout the length of the base, each of said pipe supporting structures comprising a saddle having a web portion which extends between adjacent base members and having head portions associated with the web which engage with the outer slanting surfaces of adjacent base members, a supporting member carried by the saddle and extending through a suitable opening formed in the conduit adjacent to which it is placed, a movable member carried by the support and adapted to engage with the pipe and support the same.

8. A pipe support for use with underground conduits comprising a saddle member having a web with heads at the ends thereof extending at right angles to the web, a supporting member detachably carried by the web centrally thereof and extending upwardly therefrom, and a movable member carried by the support.

9. A pipe support for use with underground conduits comprising a saddle member having a web with heads at the ends thereof extending at right angles to the web, a supporting member detachably carried by the web centrally thereof and extending upwardly therefrom, and a roller member carried by said support.

10. A pipe support for use with underground conduits comprising a saddle having a web and head portions extending at right angles thereto at the ends of the web, a supporting member detachably carried by the said web, said supporting member having opposite upstanding arms each having an elongated groove therein, and a roller member having trunnions which are associated with said elongated grooves.

11. An underground conduit for pipes comprising a conduit composed of a plurality of abutting sections, a pipe extending through said sections and housed thereby, means forming a base by which said conduit sections are supported and held in alignment, a plurality of blocks forming a part of said base, each of said blocks being provided with a top surface having longitudinally extending spaced ribs and adapted to engage with the under surface of a conduit and said base having transverse slots, pipe supporting structures associated with the base, each supporting structure comprising a saddle having a web portion which fits in a slot in said base, and having head portions at the ends of the web which engage with the side portions of the base, a support carried by the said web and extending through a suitable opening formed in the lower portion of the conduit adjacent to which it is placed, a movable member carried by the support and engaging with the pipe within the conduit.

In testimony whereof, I hereunto affix my signature.

CHRISTIAN GOTTWALD.